United States Patent
Wang et al.

(10) Patent No.: US 8,737,738 B2
(45) Date of Patent: May 27, 2014

(54) PARAMETERS INTERPOLATION FOR HIGH DYNAMIC RANGE VIDEO TONE MAPPING

(75) Inventors: Zhe Wang, Plainsboro, NJ (US); Jiefu Zhai, Cupertino, CA (US)

(73) Assignee: Thomson Licensing, Issy les Moulineaux (FR)

( * ) Notice: Subject to any disclaimer, the term of this patent is extended or adjusted under 35 U.S.C. 154(b) by 90 days.

(21) Appl. No.: 13/579,401

(22) PCT Filed: Feb. 11, 2011

(86) PCT No.: PCT/US2011/000257
§ 371 (c)(1),
(2), (4) Date: Aug. 16, 2012

(87) PCT Pub. No.: WO2011/102887
PCT Pub. Date: Aug. 25, 2011

(65) Prior Publication Data
US 2013/0163868 A1    Jun. 27, 2013

Related U.S. Application Data

(60) Provisional application No. 61/338,532, filed on Feb. 19, 2010.

(51) Int. Cl.
*G06K 9/00*    (2006.01)

(52) U.S. Cl.
USPC ........... 382/170; 382/162; 382/164; 382/167; 382/168; 382/274

(58) Field of Classification Search
USPC ......... 382/162, 164, 165, 167, 170, 168, 169, 382/173, 274, 276, 279; 340/988, 937, 148; 375/240.01; 348/47, 447, 441
See application file for complete search history.

(56) References Cited

U.S. PATENT DOCUMENTS

| | | | |
|---|---|---|---|
| 7,643,035 B2 | 1/2010 | Toyama et al. | |
| 2005/0117799 A1 | 6/2005 | Fuh et al. | |
| 2008/0037897 A1* | 2/2008 | Chiang et al. | 382/273 |
| 2008/0100743 A1 | 5/2008 | Cho et al. | |
| 2009/0310015 A1 | 12/2009 | El-Mahdy et al. | |
| 2009/0317017 A1 | 12/2009 | Au et al. | |
| 2012/0050074 A1* | 3/2012 | Bechtel et al. | 340/988 |
| 2013/0114912 A1* | 5/2013 | Schirris et al. | 382/274 |

OTHER PUBLICATIONS

Impoco, et al., "Adaptive Reduction of the Dyamics of HDR Vide Sequences", Image Processing, 2005 ICIP 2005, vol. 1, Sep. 11, 2005, pp. 945-948.
Ledda, et al., "A Local Model of Eye Adaptation for High Dynamic Range Images", vol., Conf. 3, Nov. 3, 2004, pp. 151-160, XP001238169.

* cited by examiner

*Primary Examiner* — Ali Bayat
(74) *Attorney, Agent, or Firm* — Robert D. Shedd; Richard LaPeruta

(57) ABSTRACT

A method for toning mapping high dynamic range (HDR) video for display in low dynamic range display comprises accessing the HDR video; producing a luminance information for the individual frames; partitioning different consecutive groups of frames into segments responsive to the luminance information; classifying the segments into static luminance segments and transient luminance segments; producing a tone mapping parameter set for the static luminance segments; producing a tone mapping parameter set for at least one of the transient luminance segments responsive to the tone mapping parameter set of an adjacent static luminance segment; and tone mapping the static luminance segments and transient luminance segments according to the respective tone mapping parameter sets.

15 Claims, 6 Drawing Sheets

PARAMETERS INTERPOLATION FOR HIGH DYNAMIC RANGE VIDEO TONE MAPPING

CROSS-REFERENCE TO RELATED APPLICATIONS

This application claims the benefit, under 35 U.S.C. §365 of International Application PCT/US2011/000257, filed Feb. 11, 2011, which was published in accordance with PCT Article 21(2) on Aug. 25, 2011 in English and which claims the benefit of U.S. provisional patent application No. 61/338,532, filed Feb. 19, 2010.

FIELD OF THE INVENTION

The invention relates to the tone reproduction of high dynamic range (HDR) content on low dynamic range (LDR) displays and particularly to tone reproduction for video having varying lighting conditions.

BACKGROUND OF THE INVENTION

Currently, most display devices have a limited dynamic range which is lower than that in real world scenes. HDR scenes shown on low dynamic range (LDR) display devices usually turn out to be either saturated which corresponds to overexposure in photography or extremely dark which corresponds to underexposure. Either case is undesired as numerous details can be lost.

The amount of visual content in HDR video format has been greatly increasing. Hence, tone mapping for HDR video has drawn much attention in academia as well as in industry. However, compared with the tone mapping of still images, relatively very little effort has been put on HDR video tone mapping.

For video scenes with relatively static lighting conditions, known parameter estimation methods have performed well. In such cases, generally a set of fixed parameters are applied to all frames in the same video segment with static lighting condition.

However, for varying lighting conditions within a scene of video, the application of a fixed set of parameters to frames has produced poor tone mapping results, because the tone mapping parameters can change from one frame to another. As such, a need exists for a tone mapping process that can properly and effectively perform tone mapping in scenes with varying lighting.

SUMMARY OF THE INVENTION

A method for toning mapping high dynamic range (HDR) video for display in low dynamic range display comprises accessing the HDR video; producing a luminance information for the individual frames; partitioning different consecutive groups of frames into segments responsive to the luminance information; classifying the segments into static luminance segments and transient luminance segments; producing a tone mapping parameter set for the static luminance segments; producing a tone mapping parameter set for at least one of the transient luminance segments responsive to the tone mapping parameter set of an adjacent static luminance segment; and tone mapping the static luminance segments and transient luminance segments according to the respective tone mapping parameter sets. The method can further comprise interpolating at least one parameter type to produce the tone mapping parameter set for the at least one of the transient luminance segments from the tone mapping parameter sets of two adjacent transient luminance segments, wherein the at least one parameter type can be an anchor point, a contrast boost level, and/or an exposure value. The partitioning step can comprise applying a frame-to-frame low-pass filter to frame level average luminance of the frames to produce the luminance information or alternatively, the partitioning step can further comprise generating luminance gradients of the filtered frame level average luminance to produce the luminance information. The peaks and the associated bandwidth data obtained from any of the frame-to-frame low-pass filtering steps can be used to partition the groups. Additionally, a delay can be applied to some transient luminance segments, wherein at least one frame at the beginning of the at least one transient luminance segment is not tone mapped with the parameter sets for the transient luminance segments and the following frames in the at least one transient luminance segment are tone mapped with the parameter sets for the transient luminance segments.

BRIEF DESCRIPTION OF THE DRAWINGS

The invention will now be described by way of example with reference to the accompanying figures of which.

DETAILED DESCRIPTION OF THE INVENTION

The disclosure generally pertains to video that have some scenes with varying lighting conditions. The general approach can begin with first detecting the starting and ending time of the scenes in a video. Thereafter, the approach involves calculating the parameters for every frame of the scene having varying lighting conditions by interpolating the parameter values of the previous and next scenes which have static illumination.

Figure 1:
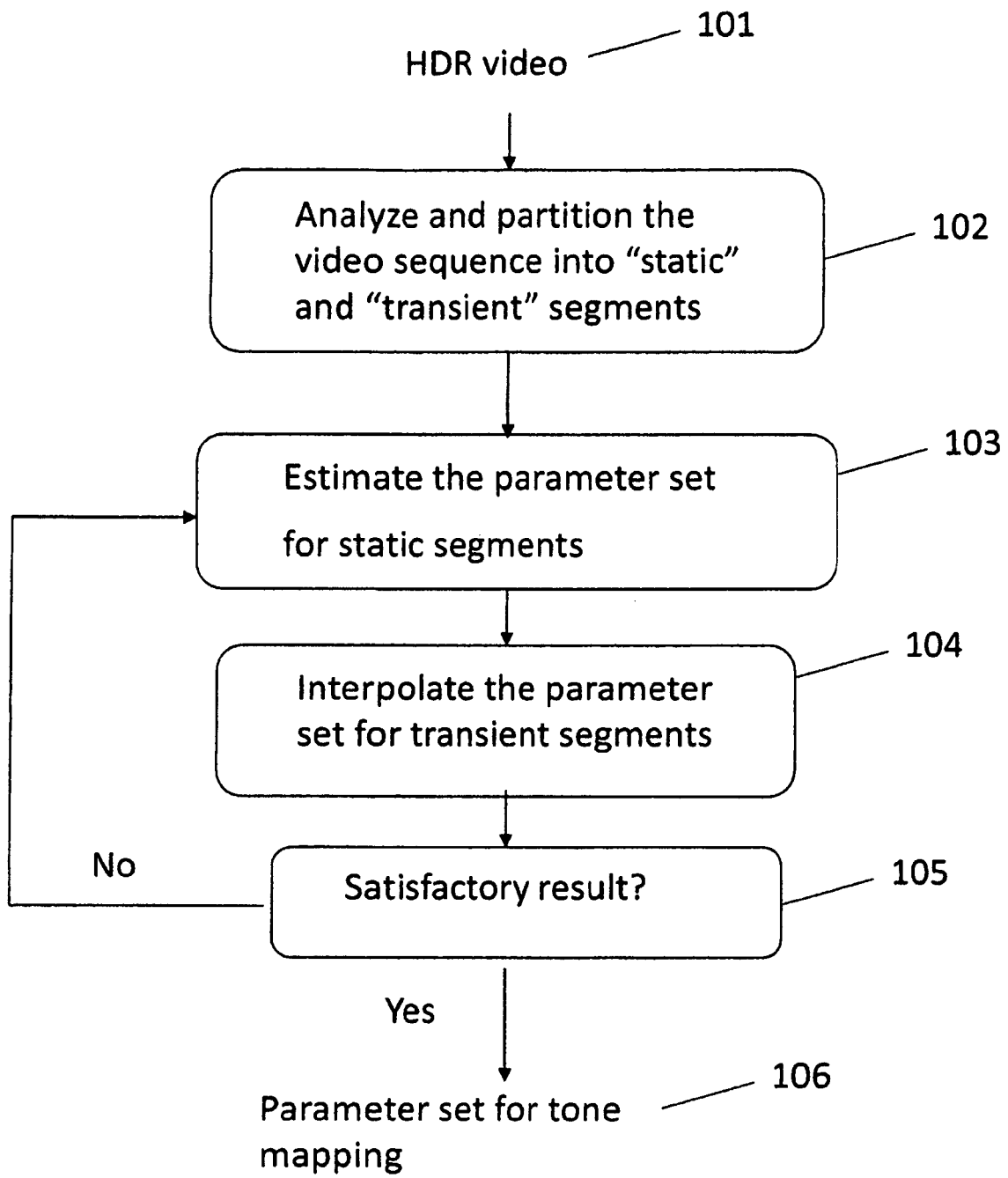
FIG. 1 is a flowchart for determining the parameter set for tone mapping according to the invention.

A general system diagram of the disclosed invention is illustrated as in FIG. 1. Overall, the scheme of parameter interpolation can be carried out by first obtaining HDR video 101 having more than one scene. A next step can involve analyzing and partitioning the video 102 into scenes or segments. The analysis here involves classifying the segments into static or transient segments. This is followed by estimating parameter sets for the static segments 103. Parameter sets for transient segments are then interpolated 104 and evaluated 105. The evaluation can be performed using an appropriate user interface. If the application of the parameter sets for the static and transient segments is satisfactory, then toning mapping is performed 106 according to the parameter sets. If the application of the parameter sets is not satisfactory, then the steps 103, 104 and 105 are rerun such that a new parameter set for static segments is estimated and found.

Figure 2:
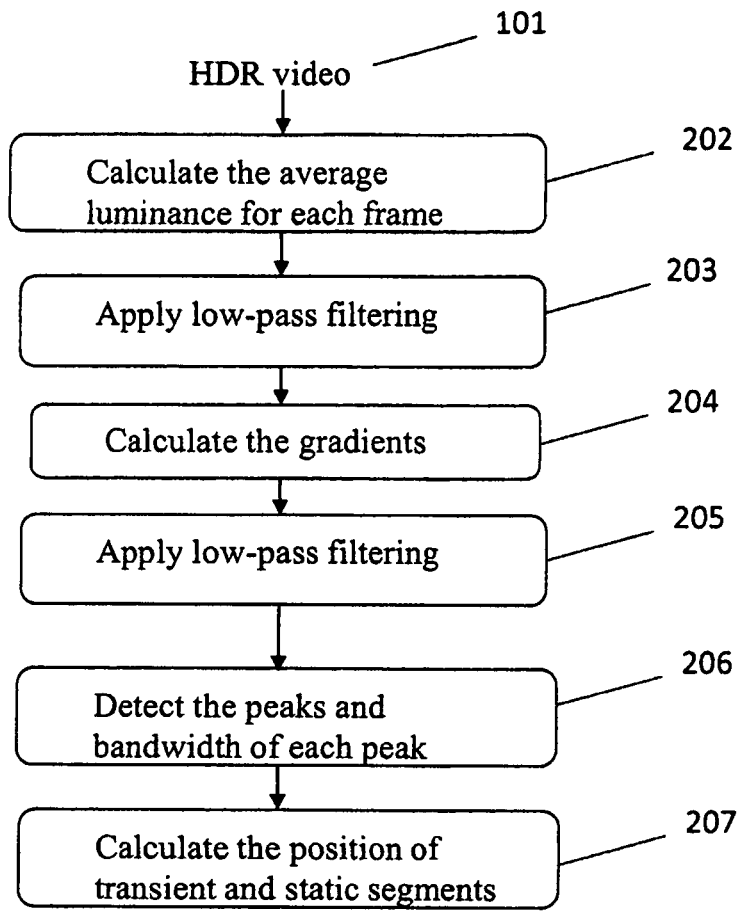
FIG. 2 is a flowchart for video sequence partitioning according to the invention.

FIG. 2 is a flowchart for video sequence partitioning in step 102 according to the invention. The video 101 is obtained and analyzed and partitioned 102 into static and transient segments. The process flow is as follows: the average luminance of each frame in calculated 202; frame-to-frame low-pass filtering 203 is applied to the average luminance data; gradients of the low-pass filter luminance data are calculated 204; frame-to-frame low-pass filtering 205 is applied to the gradient data; peaks are detected and associated bandwidths are calculated 206 from the filtered gradient data; and the positions of the transient and static segments calculated 207 from the peak and bandwidth data.

Figure 3:
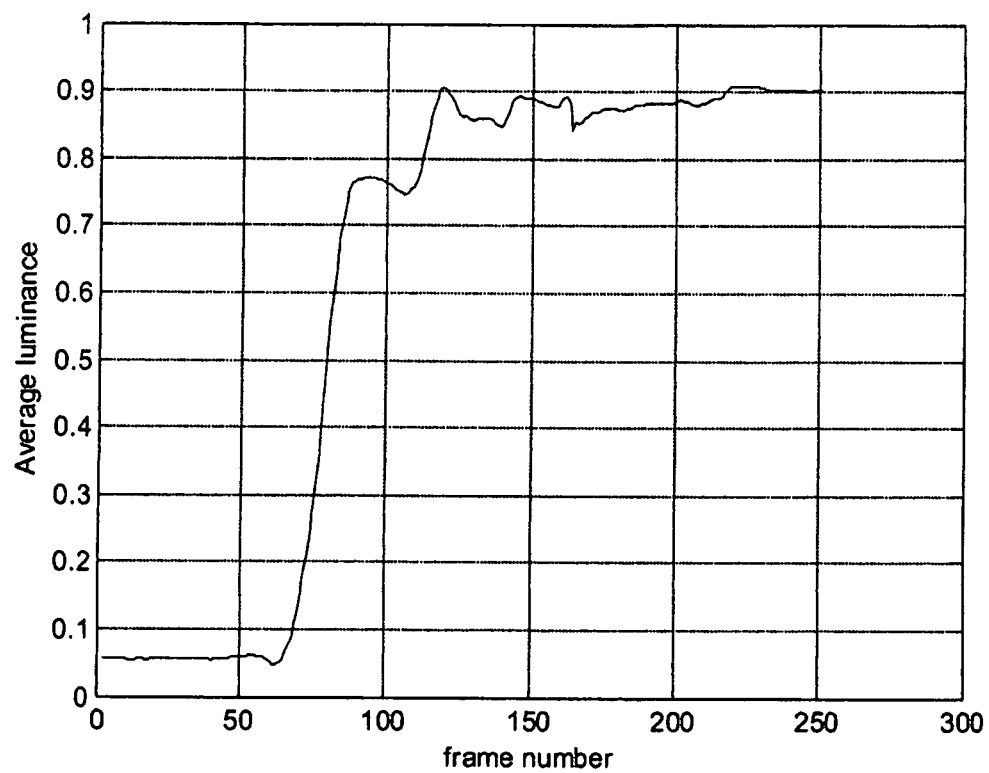
FIG. 3 is a graph showing an example of how average luminance can change in a video sequence from frame-to-frame.

With respect to the process flow in FIG. 2, the frame-level average luminance of the input HDR video is analyzed. It is important to keep in mind that the average luminance of each frame can change over time. This is illustrated in FIG. 3 which shows how the average luminance in different frames in a video sequence can change. Furthermore, a video can be partitioned into several segments according to the average luminance change. Successive frames having similar average luminance are characterize here as a static segment. The frames between two static segments may have gradually changing average luminance over time, which can be characterized as a transient segment. For example in FIG. 3, frames 0 through around 60 and frames around frame 90 at the peak having similar average luminance could be static segments and frames therebetween could comprise a transient segment.

Figure 4:
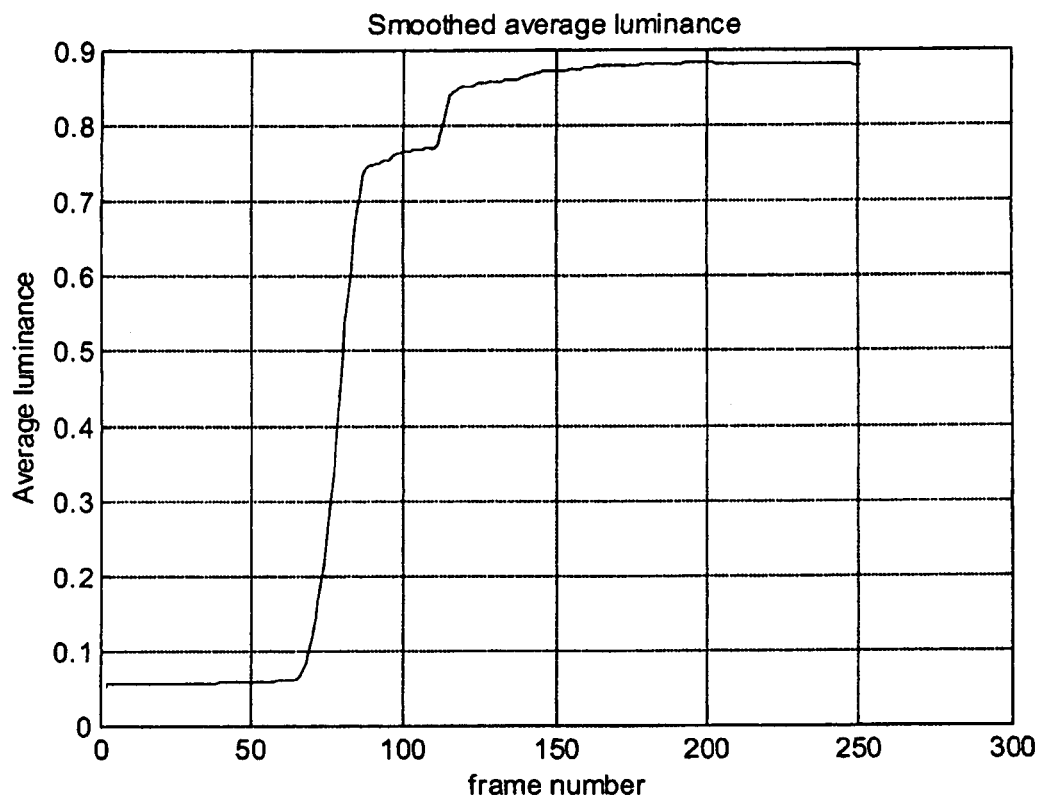
FIG. 4 is a graph showing an example of how average luminance can change in a video sequence from frame-to-frame following low pass filtering.
Figure 5:
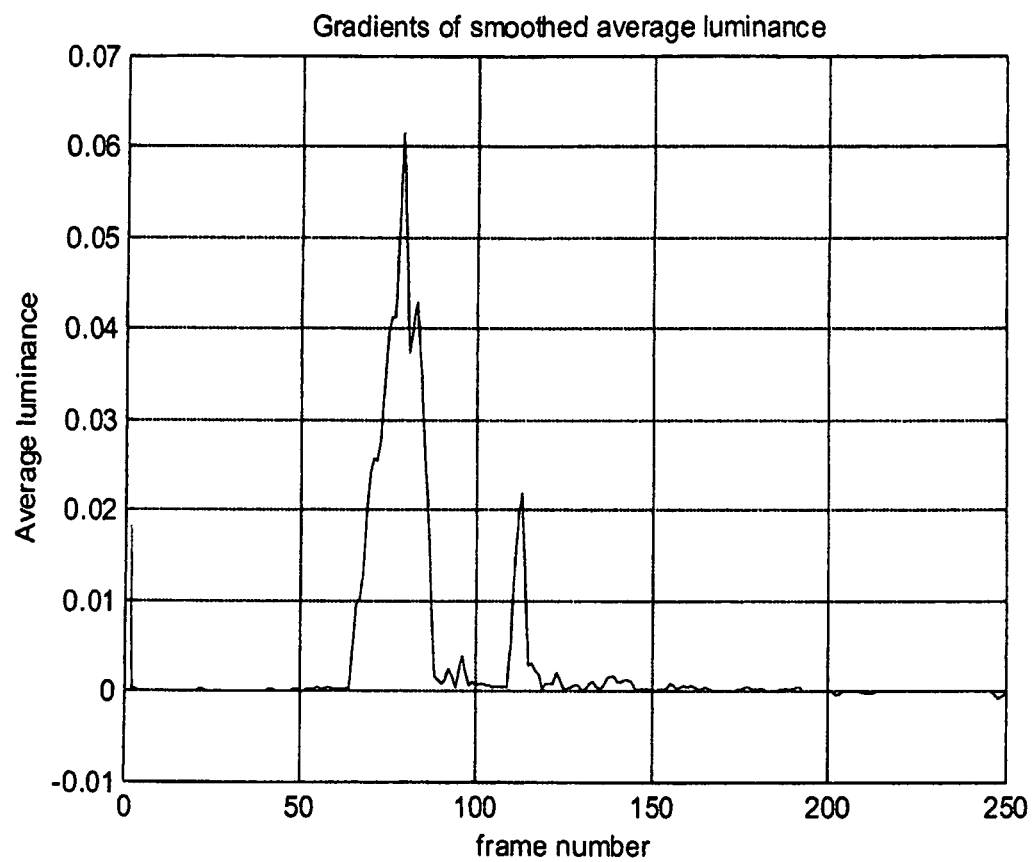
FIG. 5 is a graph showing gradients of the low pass filtered video sequence in FIG. 4.
Figure 6:
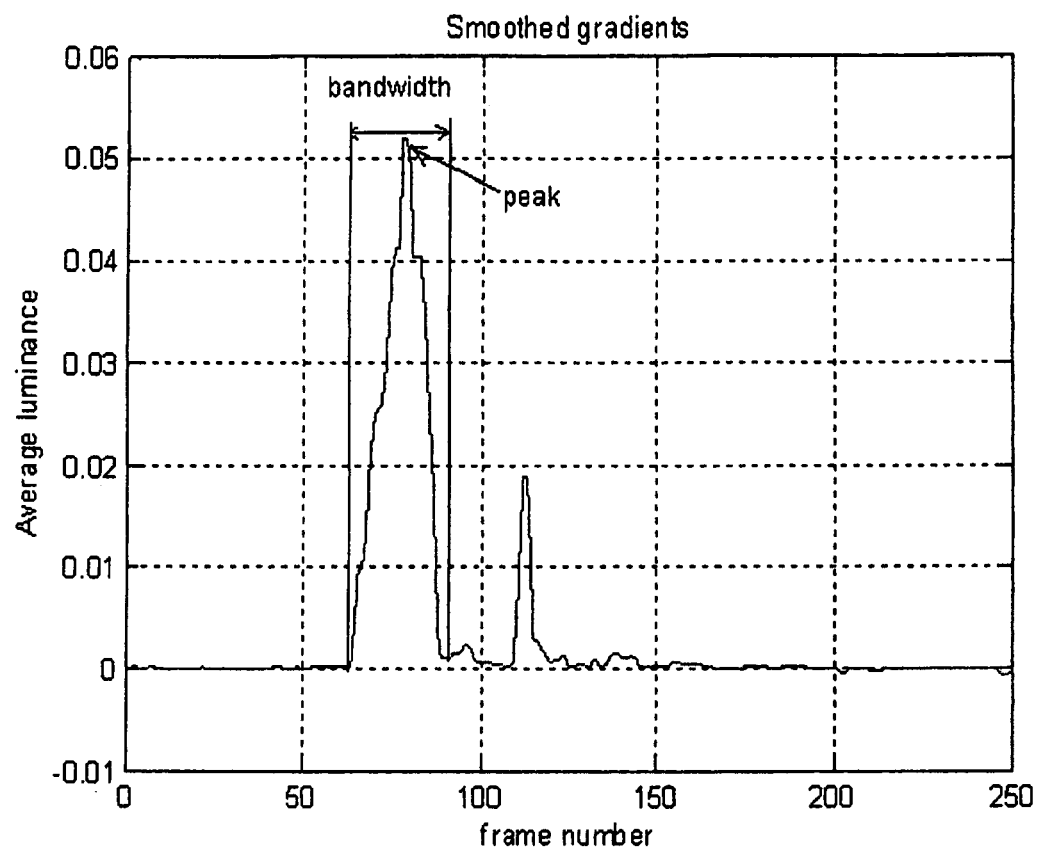
FIG. 6 is a graph showing the result of low passing filtering of the gradient in FIG. 5.

To detect the starting and ending time points of each transient segment, a scheme based on the analysis of average luminance sequence is proposed. The scheme is as follows:

a) apply a low-pass filter to the average luminance sequence 203 in FIG. 3 to smooth luminance as illustrated in FIG. 4;

b) calculate the gradients 204 of the smoothed luminance sequence as shown in FIG. 5 and optionally apply a low-pass filter 205 to the gradients in FIG. 5 to obtain smooth gradient as shown in FIG. 6;

c) detect the peaks and bandwidth 206 of each peak in gradient curve in FIG. 5 or the low pass filter gradient curve in FIG. 6; and d) calculate the transient and static positions 207.

The starting time point of each transient area can be calculated or estimated by subtracting half of the bandwidth from the peak frame number. The ending time point of the transient area can be calculate by adding half of the bandwidth to the peak frame number.

After the static and transient segments are located, the parameter set for a key frame of the static segments are estimated and then applied to the whole segment. The parameter set can include anchor points from which the image can be segmented into several regions, exposure value for each region, contrast boost parameters, and any other needed parameter for HDR tone mapping. Regarding the parameter set, the exposure values, anchor points and contrast boost can be obtained by any of a number of techniques; however, contrast boost and anchor points are discussed in greater detail below.

In at least one implementation one can define a series of anchor points $A_i$ (i=1 ... N) such that each $A_i$ can be used to define a region and also generate a single exposure image. The anchor points can be chosen as:

$$A_i = L_{avg}/E \quad A_{n+1} = 4 \cdot A_n = (n=2 \ldots N-1)$$

where E in the above equation is a constant and can take the value of 8. The number of regions N in the above equation can be computed as below, which is able to cover the entire luminance range.

$$N = \left\lceil \left( \log_2\left( \max\left( \frac{L_{max} \cdot E}{L_{avg}}, 1 \right) \right) + 1 \right) / 2 \right\rceil + 1$$

L is the luminance image, which can be computed from the HDR data. If the HDR data is in XYZ color space, the Y component can be used as luminance image. If the HDR data uses the same primary colors as Rec. 709, the conversion from RGB color space can be done as follows:

$$L(i,j) = 0.2126 * R(i,j) + 0.7152 * G(i,j) + 0.0722 * B(i,j)$$

Other conversions between RGB (or other color spaces) and the luminance image can be used depending on the format of the input picture.

Once the anchor point of each region is known, one can compute the weight of each pixel for each region. In general, for each region defined by the corresponding anchor point $A_i$, the pixel with the closest value to the single exposure image is 0.5 and that pixel has a larger weight for that region than other pixels.

Thus, the weight of pixel at location (i,j) for region n (defined by anchor point $A_n$) can be computed as below:

$$W_n(i,j) = Ce^{\frac{\left(S\left(\frac{L(i,j)}{2A_n}\right) - 0.5\right)^2}{\sigma^2}}$$

where C is a normalization factor and is defined as:

$$C = \frac{1}{\sum_n e^{\frac{\left(S\left(\frac{L(i,j)}{2A_n}\right) - 0.5\right)^2}{\sigma^2}}}$$

The above computed weights take values in the range [0,1] and hence define a fuzzy segmentation of the luminance image into N regions. This means each region might contain all the pixels in the image, although only a portion of them might have large weights.

With linear scaling, one can specify one anchor point. A pixel will be saturated and mapped to one if the luminance of that pixel exceeds the anchor point, otherwise it will be mapped to a value between 0 and 1. Therefore, the linear scaling single exposure can be defined as:

$$I(i,j) = S\left(\frac{L(i,j)}{A}\right)$$

where A is the anchor point and S(x) can be defined as:

$$S(x) = \begin{cases} 1 & x > 1 \\ x^{1/\rho} & \text{otherwise} \end{cases}$$

The parameter p can take values in the range [2.2,2.4] and represents the gamma of the output device to which the tone mapped image will be shown. The resulting image I can be quantized and displayed on a conventional LDR display. Note that other definitions of S(x) are possible. For example, an S-shaped curve can be used instead of the power function. In general, any global mapping curve can be used for S.

In another implementation, the weights are binarized, which results in either 0 or 1 and a hard segmentation:

$$p = \underset{n}{\mathrm{ArgMax}}(W_n(i,j)) \quad n = 1, 2, \ldots, N$$

$$W_p(i,j) = 1 \qquad W_q(i,j) = 0 \ (q \neq p)$$

It is important to note that the anchor points $A_n$ as well as the weights $W_n$ are fixed once the segmentation is done.

The contrast boost can be obtained by using a bandpass pyramid, known as a Laplacian pyramid which is obtained by forming the difference between adjacent levels in a pyramid, wherein an interpolation is performed between representations at adjacent levels of resolution, to enable the computation of pixel to pixel differences. $I^k$ is one level of the Laplacian pyramid of image I, where k={1, . . . , K}. k is the level and K the number of levels in the pyramid. I can represent, a color component of a digital image. I(i,j) represents the value of the pixel at coordinates (i,j). The image is then reconstructed by the pyramid $I^k \cdot B^k$, where B is the contrast boost which is characterized as the power function $$\begin{cases} B^k(i,j) = 1 & k = K \\ B^k(i,j) = \left(\dfrac{|I^k(i,j)|}{\alpha}\right)^{\beta-1} & k = \{1, \ldots, K-1\} \end{cases}$$

Here, shape controller $\alpha$ is in the range [0,1] and is typically between 0.2 and 0.4 and boost intensity $\beta$ is a positive number usually in the range [0,2]. Note that $\beta<1$ increases the contrast, whereas $\beta>1$ reduces the contrast. With these two parameters, one can control how much enhancement to apply to the image. It should be noted that the contrast boost pyramid $B^k$, k={1, . . . , K} can be computed using different formulations.

After the parameter sets have been determined for the static segments, an implementation of the invention uses the parameters of two adjacent static segments for interpolation. As such, the next step shown in FIG. 1 is to interpolate the parameter set for the transient segments 104. Utilized are two interpolation schemes. One is interpolation without light adaptation. The other is interpolation with light adaptation.

For the transient segments for the approach without light adaptation, one can interpolate the parameter set based on the parameters of static segments obtained from the previous step. The interpolation can be done as linear interpolation in logarithm domain, as follows.

$$A_j = \frac{A_m - A_n}{m - n} \times (j - n) + A_n$$

$$B_j = \frac{B_m - B_n}{m - n} \times (j - n) + B_n$$

$$G_j = \frac{G_m - G_n}{m - n} \times (j - n) + G_n$$

where A, B and G denote the anchor point, contrast boost level and exposure value in logarithm domain respectively; m and n denote the starting and ending frame index of the transient segment, j is the current frame number located in the transient segment. If light adaptation is not considered, the A, B and G values are used as the parameters for transient segments.

However, the human visual system performs effectively over a vast range of luminous intensities, ranging from below starlight to sunlight. The faster recovery from dark to light changes or small light decrements, which can take seconds, is known as light adaptation.

In an implementation with light adaptation, the above parameter interpolation is performed to simulate how human visual system gets adapted to the light condition change. This is particularly useful when the environment becomes much brighter.

Essentially the idea is to introduce a delay factor in the parameter interpolation. For the first few frames in the transition period, the parameters from a previous scene are still used. After that, a linear interpolation in logarithm domain will be used:

$$A_j = \begin{cases} A_n & \text{if } n \leq j < l \\ \dfrac{A_m - A_n}{m - l} \times (j - l) + A_n & \text{if } l \leq j < m \end{cases}$$

$$B_j = \begin{cases} B_n & \text{if } n \leq j < l \\ \dfrac{B_m - B_n}{m - l} \times (j - l) + B_n & \text{if } l \leq j < m \end{cases}$$

$$G_j = \begin{cases} G_n & \text{if } n \leq j < l \\ \dfrac{G_m - G_n}{m - l} \times (j - l) + G_n & \text{if } l \leq j < m \end{cases}$$

where A, B and G denote the anchor point, contrast boost level and gain value in logarithm domain respectively; m and n denote the starting and ending frame index of the transient segment, and j is the current frame number located in the transient segment. l denotes the time delay of the start of lighting change, which simulates how human visual system gets adapted to abrupt lighting change. Usually, the value of l is taken as 3~6 frames.

Once the parameter sets for transient segments have been obtained that can be either directly applied to the video to tone map the video 106, parameter sets can be evaluated 105. As mentioned above, the evaluation can be performed using an appropriate user interface, wherein if the application of the parameter sets for the static and transient segments is satisfactory, then toning mapping is performed 106 according to the parameter sets and if the application of the parameter sets is not satisfactory, then the steps 103, 104 and 105 are rerun such that a new parameter set for static segments is estimated and found. Rerunning of the steps 103, 104 and 105 can involve applying an additional low-pass filter operation on the gradient data and/or modifying the contrast boost parameters.

While certain embodiments of the present invention have been described above, these descriptions are given for purposes of illustration and explanation. Variations, changes, modifications and departures from the systems and methods disclosed above may be adopted without departure from the scope or spirit of the present invention.

The invention claimed is:
1. A method comprising:
   accessing a video having a plurality of individual frames;
   producing a luminance information for the individual frames;
   partitioning different consecutive groups of frames into segments responsive to the luminance information;
   classifying the segments into static luminance segments and transient luminance segments;
   producing a tone mapping parameter set for the static luminance segments;

producing a tone mapping parameter set for at least one of the transient luminance segments responsive to the tone mapping parameter set of an adjacent static luminance segment; and tone mapping the static luminance segments and transient luminance segments according to the respective tone mapping parameter sets.

2. The method of claim 1 comprises interpolating at least one parameter type to produce the tone mapping parameter set for the at least one of the transient luminance segments from the tone mapping parameter sets of two adjacent transient luminance segments.

3. The method of claim 2 comprises selecting the at least one parameter type from the group consisting of anchor point, contrast boost level or exposure value.

4. The method of claim 1 applying a frame-to-frame low-pass filter to frame level average luminance of the frames to produce the luminance information for the partitioning step.

5. The method of claim 1 comprises:
applying a frame-to-frame low-pass filter to frame level average luminance of the frames; and
generating luminance gradients of the filtered frame level average luminance to produce the luminance information for the partitioning step.

6. The method of claim 1 comprises:
applying a frame-to-frame low-pass filter to frame level average luminance of the frames;
generating luminance gradients of the filtered frame level average luminance;
detecting peaks and associated bandwidth data from the gradients;
using the peaks and the associated bandwidth data as the luminance information for the partitioning step.

7. The method of claim 6 wherein a starting time point of the transient luminance segments is determined from the difference of a peak-frame value and half of the corresponding bandwidth and an ending time point of the transient luminance segments is determined from the sum of a peak frame value and half of the bandwidth.

8. The method of claim 2 comprises:
applying a frame-to-frame low-pass filter to frame level average luminance of the frames; and
generating luminance gradients of the filtered frame level average luminance to produce the luminance information for the partitioning step.

9. The method of claim 2 comprises:
applying a frame-to-frame low-pass filter to frame level average luminance of the frames;
generating luminance gradients of the filtered frame level average luminance;
detecting peaks and associated bandwidth data from the gradients;
using the peaks and the associated bandwidth data as the luminance information for the partitioning step.

10. The method of claim 9 wherein a starting time point of the transient luminance segments is determined from the difference of a peak frame value and half of the corresponding bandwidth and an ending time point of the transient luminance segments is determined from the sum of a peak frame value and half of the bandwidth.

11. The method of claim 2 applying a frame-to-frame low-pass filter to frame level average luminance of the frames to produce the luminance information for the partitioning step.

12. The method of claim 8 comprises selecting the at least one parameter type from the group consisting of anchor point, contrast boost level or exposure value.

13. The method of claim 9 comprises selecting the at least one parameter type from the group consisting of anchor point, contrast boost level or exposure value.

14. The method of claim 1 comprises applying a delay to at least one transient luminance segment such that at least one frame at the beginning of the at least one transient luminance segment is not tone mapped with the parameter sets for the transient luminance segments and the following frames in the at least one transient luminance segment are tone mapped with the parameter sets for the transient luminance segments.

15. The method of claim 14 wherein the delay is 3 to 6 frames.

* * * * *